United States Patent
Power et al.

(10) Patent No.: US 7,293,781 B2
(45) Date of Patent: Nov. 13, 2007

(54) ANTI-CREEP TRAILER LOCKING MECHANISM

(75) Inventors: Andrew Power, Kalamazoo, MI (US); James F. Ziech, Kalamazoo, MI (US)

(73) Assignee: Hendrickson USA, L.L.C., Itasca, IL (US)

( * ) Notice: Subject to any disclaimer, the term of this patent is extended or adjusted under 35 U.S.C. 154(b) by 357 days.

(21) Appl. No.: 11/118,639

(22) Filed: Apr. 29, 2005

(65) Prior Publication Data

US 2006/0244225 A1 Nov. 2, 2006

(51) Int. Cl.
*B60S 9/00* (2006.01)
*B60S 9/04* (2006.01)

(52) U.S. Cl. .............. 280/6.151; 280/124.116

(58) Field of Classification Search ........... 280/6.15, 280/6.151, 6.157, 6.159, 124.116, 124.157, 280/124.158, 124.159
See application file for complete search history.

(56) References Cited

U.S. PATENT DOCUMENTS

| | | | |
|---|---|---|---|
| 2,997,342 A * | 8/1961 | Talbert | 298/17 R |
| 3,083,059 A * | 3/1963 | Biszantz | 298/17 S |
| 3,530,488 A | 9/1970 | Beckwith | |
| 4,279,050 A | 7/1981 | Abbott | |
| 4,568,094 A | 2/1986 | Lovell | |
| 4,963,068 A | 10/1990 | Gelder | |
| 5,440,772 A | 8/1995 | Springer et al. | |
| 5,782,538 A * | 7/1998 | Backs | 298/17.5 |
| 5,833,253 A | 11/1998 | Hess | |
| 5,921,532 A * | 7/1999 | Pierce et al. | 267/64.19 |
| 6,152,486 A * | 11/2000 | Pierce | 280/755 |
| 6,257,597 B1 | 7/2001 | Galazin | |
| 6,412,789 B1 * | 7/2002 | Pierce et al. | 280/6.151 |
| 6,679,509 B1 * | 1/2004 | Galazin et al. | 280/124.116 |
| 7,192,033 B2 * | 3/2007 | Bolt et al. | 280/5.514 |

* cited by examiner

*Primary Examiner*—Eric Culbreth
*Assistant Examiner*—Joseph Rocca
(74) *Attorney, Agent, or Firm*—Buckingham, Doolittle & Burroughs, LLP.; David P. Dureska; Brent L. Moore (57) ABSTRACT

An anti-creep locking mechanism for a trailer suspension system is disclosed. The disclosed locking mechanism includes at least one column that may be swung into a first position in a gap formed between a trailer frame and a suspension component to keep a trailer at a predetermined height. The column is biased into the first position by a spring. An actuator, such as a contracting air bag or an air cylinder with a linkage assembly, is used to overcome the biasing force of the spring and retract the column into a second position, thereby deactivating the anti-creep locking mechanism. The anti-creep mechanism may further include an angle limiter to insure that column is fully retracted once the system is deactivated.

22 Claims, 6 Drawing Sheets

ANTI-CREEP TRAILER LOCKING MECHANISM

FIELD OF THE INVENTION

The present invention relates to an anti-creep mechanism for use with a trailer suspension, and more specifically to a mechanism that restricts movement in the forward and downward movement of the trailer during loading and unloading.

BACKGROUND

In a conventional leading or trailing arm trailer suspension, a leading or trailer arm, respectively, extends from the trailer frame for connection with the trailer axle. The arm is pivotally connected at one end to the trailer frame and is also connected at a second end to the trailer axle. The arm may extend over or under the trailer axle and supports an air spring thereon.

In one known trailer suspension, to lock the trailer at a predetermined positional height and to prevent the trailer from moving during loading and/or unloading, the trailer suspension includes a locking mechanism. In one embodiment, the locking mechanism utilizes the weight of the trailer to engage and lock the trailer to a predetermined height against the dock. After the trailer is loaded or unloaded, the air springs are activated such that the air springs are inflated to lift the trailer up and release the dock lock. However, even though the air springs may inflate to full pressure, the dock lock may stick such that the weight of the trailer may keep the dock lock engaged. Accordingly, as the trailer pulls away from the dock and goes over a bump, the trailer rises, taking the weight off the locking mechanism and disengaging it such that the locking mechanism slams down on travel limit stops, oftentimes causing damage to the trailer suspension.

In addition, welded connections on the trailer axles may be weakened and often fail due to the sudden weight crashing down. Further, the stress placed on the welded connections often extends to the axle itself, resulting in a weakening or failure of the axle.

Therefore, there is a need for an improved suspension system that will minimize or eliminate one or more of the above-mentioned deficiencies.

BRIEF SUMMARY

The embodiments described herein are directed to a locking mechanism for preventing creep of a trailer during loading or unloading by keeping the trailer at a predetermined height during loading and unloading. In accordance with one aspect of the invention, the inventive locking mechanism includes at least one selectively positionable column that is attached to a rail of a trailer frame. When it is in an operational position, the column, which is spring loaded, is extended downwardly with a contacting portion facing a portion of a connector or other frame component. The column is sized such that, at most, only a small gap exists between the contacting portion of the column and the portion of the connector or other frame component. Thus, when the trailer is docked and being loaded (or unloaded), the height of the trailer is substantially maintained.

When the trailer is to be moved, the column is retracted such that the contacting portion of the column is pivoted upwardly toward the center of the trailer frame to avoid any interference with the suspension system during normal driving. In one embodiment, an air bag that is operably connected to the parking brake circuit and has a portion connected to the column, is inflated so as to pull the column into the retracted position. In another embodiment, a pivot and linkage system is used to position the column in the retracted position.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Figure 1:
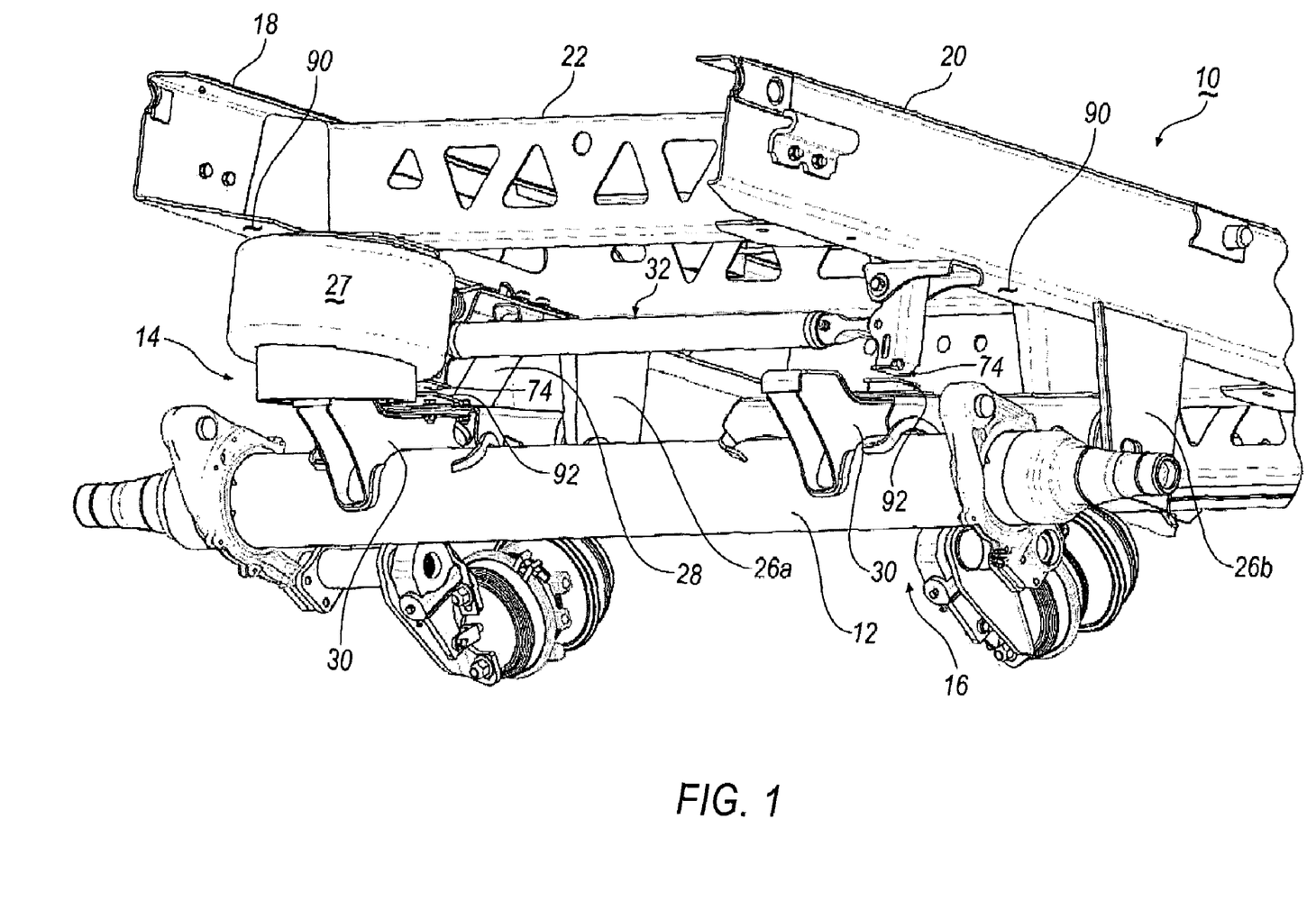
FIG. 1 is a partial perspective view of a trailer frame supported on at least one axle by a suspension system illustrating a locking system in an engaged position in accordance with one embodiment of the present invention.
Figure 2:
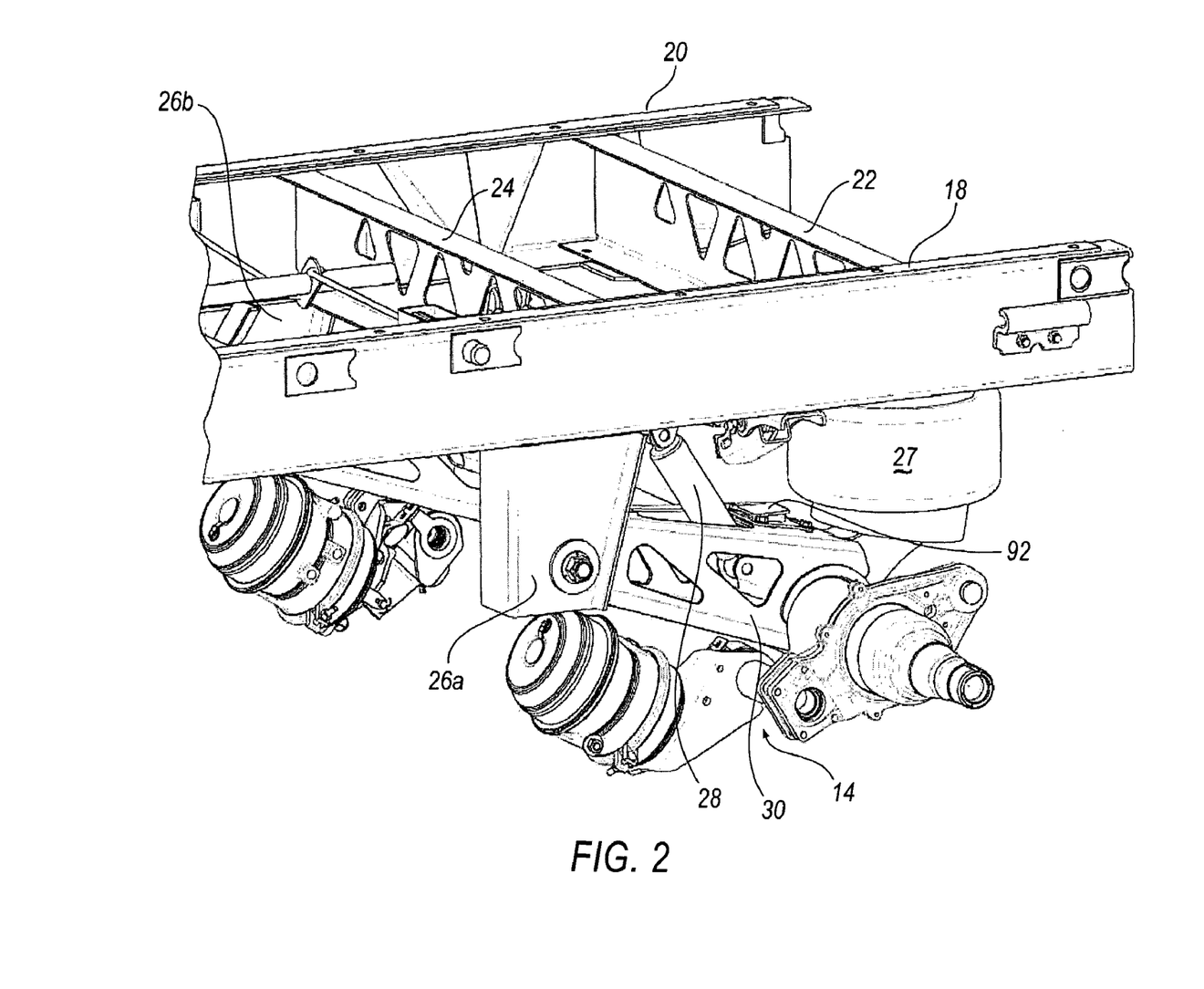
FIG. 2 is a close up perspective view of a portion of the trailer frame illustrating a locking system in a disengaged position in accordance with the present invention.
Figure 3:
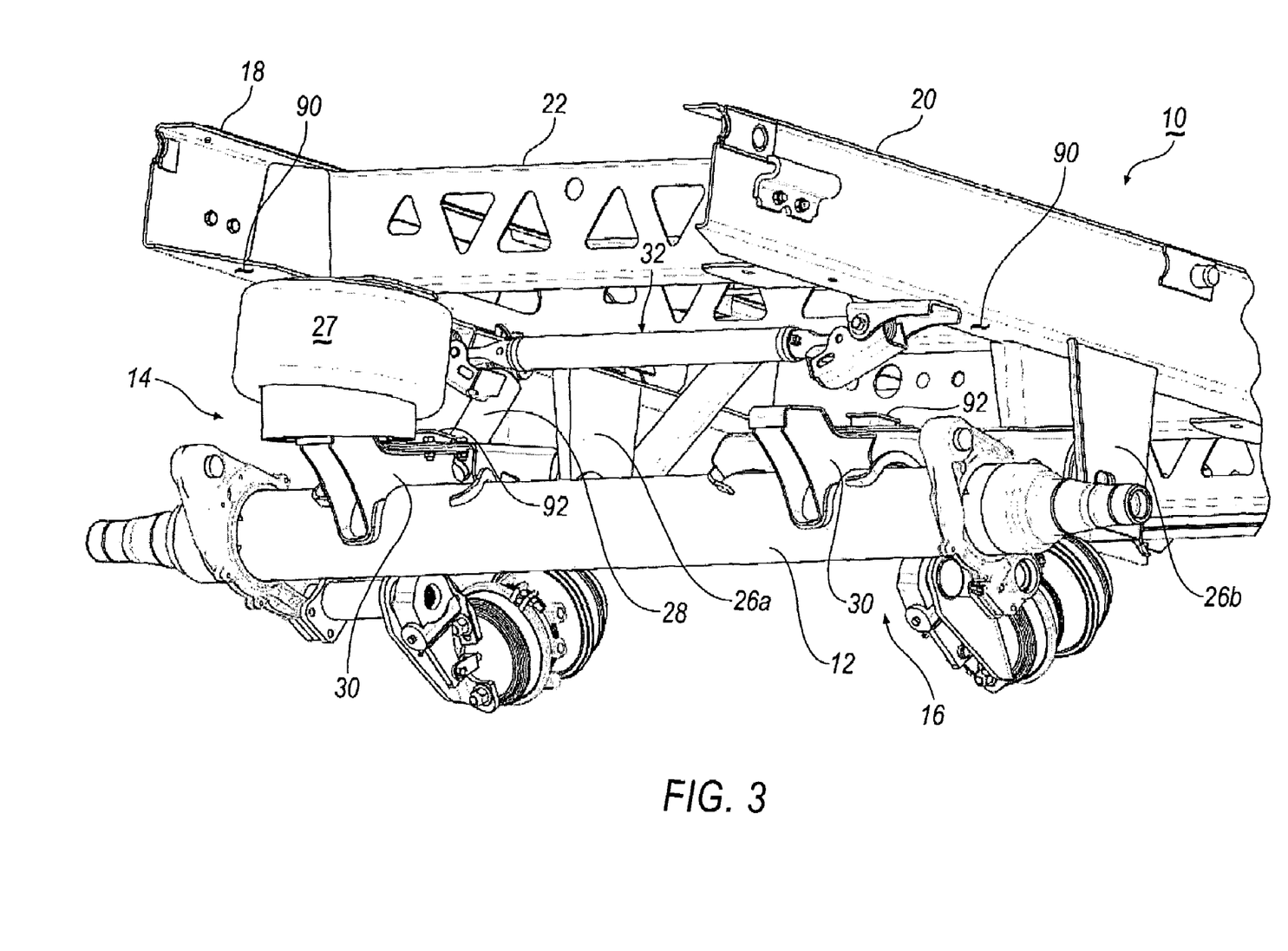
FIG. 3 is a close up perspective view of a portion of the trailer frame illustrating the dock lock system in a disengaged position in accordance with the present invention.

Illustrative embodiments of the invention are described below. Referring now to the drawings where like reference numerals are used to identify identical components in the various views, FIGS. 1-3 illustrate a trailer frame 10 supported on at least one trailer axle 12 by suspension systems 14 and 16.

Frame 10 is provided to support a conventional trailer on axle 12. Frame 10 is conventional in the art and may be made from conventional metals and metal alloys. Frame 10 includes a pair of longitudinal rails 18, 20 extending in the direction of vehicle travel and in the longitudinal direction of the trailer and one or more cross-members 22, 24. Frame 10 may also include a plurality of hangers 26a and 26b descending from rails 18, 20. Rails 18, 20 are provided to secure and align a trailer (not shown) on frame 10 and are conventional in the art. Rails 18, 20 are generally C-shaped in cross-section.

Cross-members 22, 24 are provided to connect rails 18, 20 and are also conventional in the art. Cross-members 22, 24 may also serve as a mechanism for mounting components of suspension systems 14, 16 and may also provide a bearing surface for the springs of suspension systems 14, 16.

Axle 12 is provided to rotatably support wheels (not shown) of the trailer, braking systems and other components. Axle 12 is conventional in the art and may be forged or formed from a variety of conventional metals and metal alloys. Although axle 12 is circular in cross-section in the illustrated embodiment, it will be understood by those of skill in the art that the shape and other design characteristics of axle 12 may vary depending upon a variety of design requirements. Further, although only one axle 12 is shown in the Figures, it should be understood that the present invention may have any number of axles.

Suspension system 14 is provided to support frame 10 on rear axle 12. Suspension system 14 may include one or more air springs 27, as well as suspension shock absorbers 28 that extend between rails 18 and 20 and a suspension arm 30 that attaches to axle 12.

Figure 7:
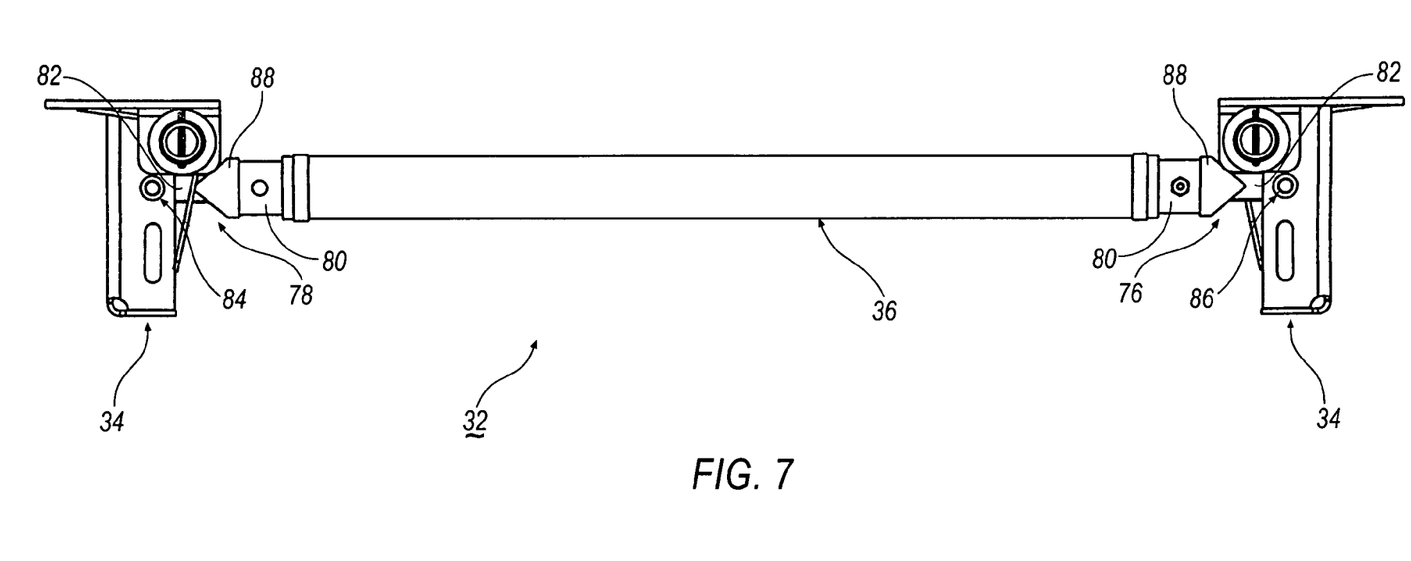
FIG. 7 is an elevational view of the dock lock assembly of the present invention.

In accordance with the present invention, trailer frame 10 is further provided with locking assembly 32 as best shown in FIGS. 4-7. Locking assembly 32 is used to keep the trailer at its approximate ride height during loading and unloading. As best seen in FIG. 7, locking assembly 32 includes at least one column sub-assembly 34. In another embodiment, the locking assembly 32 includes two column sub-assemblies, one column sub-assembly for each suspension arm 30 located on the rear axle 12 of frame 10. A selectively inflatable air bag 36 is positioned between column sub-assemblies 34.

Figures 4, 5, 6:
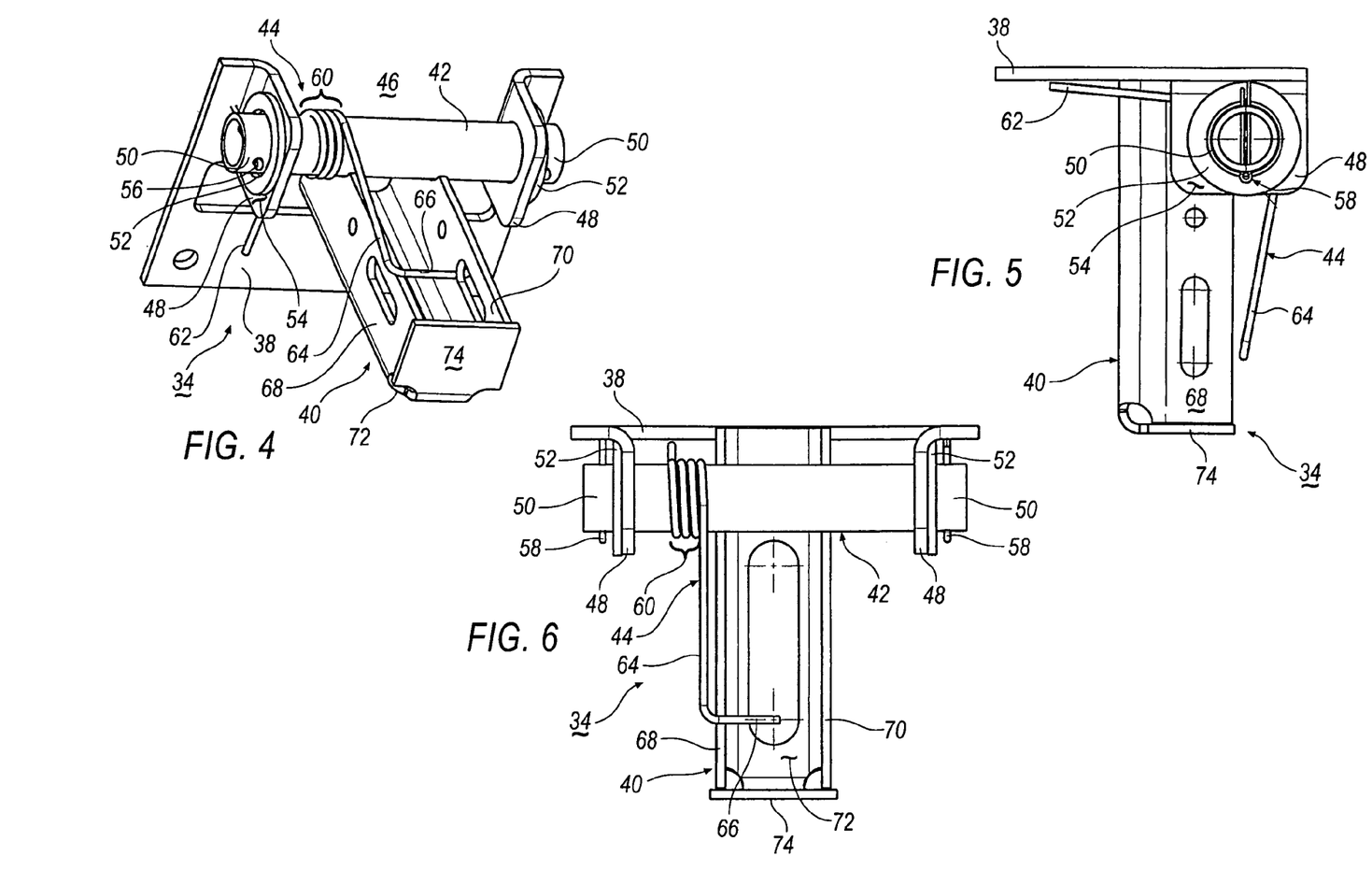
FIG. 4 is a perspective view of one column sub-assembly of the dock lock system.
FIG. 5 is a side elevational view of the column sub-assembly of FIG. 4.
FIG. 6 is a front elevational view of the column sub-assembly of FIG. 4.

Referring to FIGS. 4-6, each column sub-assembly 34 includes a base portion 38, a column 40, a shaft 42, and a spring 44. Base portion 38 is generally planar and has an open end 46 that is flanked by two upstanding mounting flanges 48. Shaft 42 is mounted between flanges 48 for rotational movement. In one embodiment, ends 50 of shaft 42 extend outwardly through openings formed through flanges 48. Washers 52 may be positioned around ends 50 against an outside surface 54 of flanges 48. Openings 56 are formed through ends 50 and a fastener 58, such as a cotter pin, are positioned through openings 56 so as to secure shaft 42 to base portion 38.

Spring 44 is mounted on shaft 42 such that a portion 60 of spring 44 is coiled around shaft 42 on one side of shaft 42. A first end 62 of spring 44 extends outwardly so as to extend out over a section of base portion 38. A second end 64 of spring 44 extends upwardly from coiled portion 60 and has a contacting section 66 that extends laterally from second end 64.

Column 40 includes a pair of side walls 68, 70, a rear wall 72 and a contacting portion 74 that is attached to side walls 68, 70 and rear wall 72. Side walls 68, 70 have a lower portion that is curved to correspond to the outside contour of shaft 42. Side walls 68, 70 are positioned on shaft 42 and fixedly connected thereto such that column 40 is mounting for rotational movement. In one embodiment, side walls 68, 70 are welded to shaft 42. In addition, contacting section 66 of spring 44 is positioned so as to extend in front of at least a portion of column 40.

Referring to FIG. 7, air bag 36 is positioned between each column sub-assembly 34. Air bag 36 is an elongated member having two ends 76, 78. Each end 76, 78 includes a mounting collar 80 that further includes a mounting shaft 82 attached thereto. A distal end of the mounting shaft 82 extends between sidewalls 68, 70 of column 40 and is connected thereto by a fastener 86. A washer 84 may also be used. In accordance with another aspect of the invention, collar 80 may further include an angle section 88 that serves as an angle limiter for column 40, to be explained in further detail below.

As seen in FIGS. 1-3, locking assembly 32 is positioned within a gap located between suspension shock absorber 28 and/or air spring 27 and frame 10. Base portions 38 of column sub-assemblies 34 are mounted on a bottom surface 90 of each rail 18, 20 with the open end 46 facing toward the inside of frame 10 such that contacting portion 74 extends downwardly toward axle 12 when in the locked position. Air bag 36 is positioned between each column sub-assembly 34. Spring 44 biases each column 40 into the locked position as shown in FIGS. 1 and 2. When in this position, contacting portion 74 is aligned with a contact pad 92 that is positioned on each connector 30 such that when subjected to drastic weight change, contacting portion 74 contacts contact pad 92 to limit creep of frame 10.

In accordance with another aspect of the invention, air bag 36 is connected to an air circuit (not shown) that feeds the parking brake circuit. Thus, when the parking brake is set, air bag 36 is deflated and columns 40 are biased by spring 44 into the locked position. When the parking brakes are released, air bag 36 inflates, overcoming the biasing force of spring 44 and pulling columns up towards frame 10.

To insure that air bag 36 pulls both columns up and out of the way so as not to interfere with the suspension system when the vehicle carrying frame 10 is in normal operating mode, air bag 36 is provided with angle sections 88 that serve as a built in angle limit. Angle section 88 has a predetermined shape that corresponds with the maximum angle that each column 40 may be positioned at. Thus, when air bag 36 inflates and pulls each column 40 out of the way, the angle section 88 interferes with the travel path of column 40 when column 40 is at its desired maximum angle. Once this interference occurs, the force generated by air bag 36 will be focused on the other column 40 that is not at the maximum position.

In accordance with another aspect of the invention, to prevent potential damage to locking assembly 32 that are caused by abrupt hard stops, when locking assembly 32 is fully deactivated (i.e., air bag 36 is inflated), locking assembly 32 is sized such that only one angle section 88 may touch one column 40. The opposite side includes a small gap between angle section 88 and column 40 so that the force generated by air bag 36 is absorbed internally.

Figure 8:
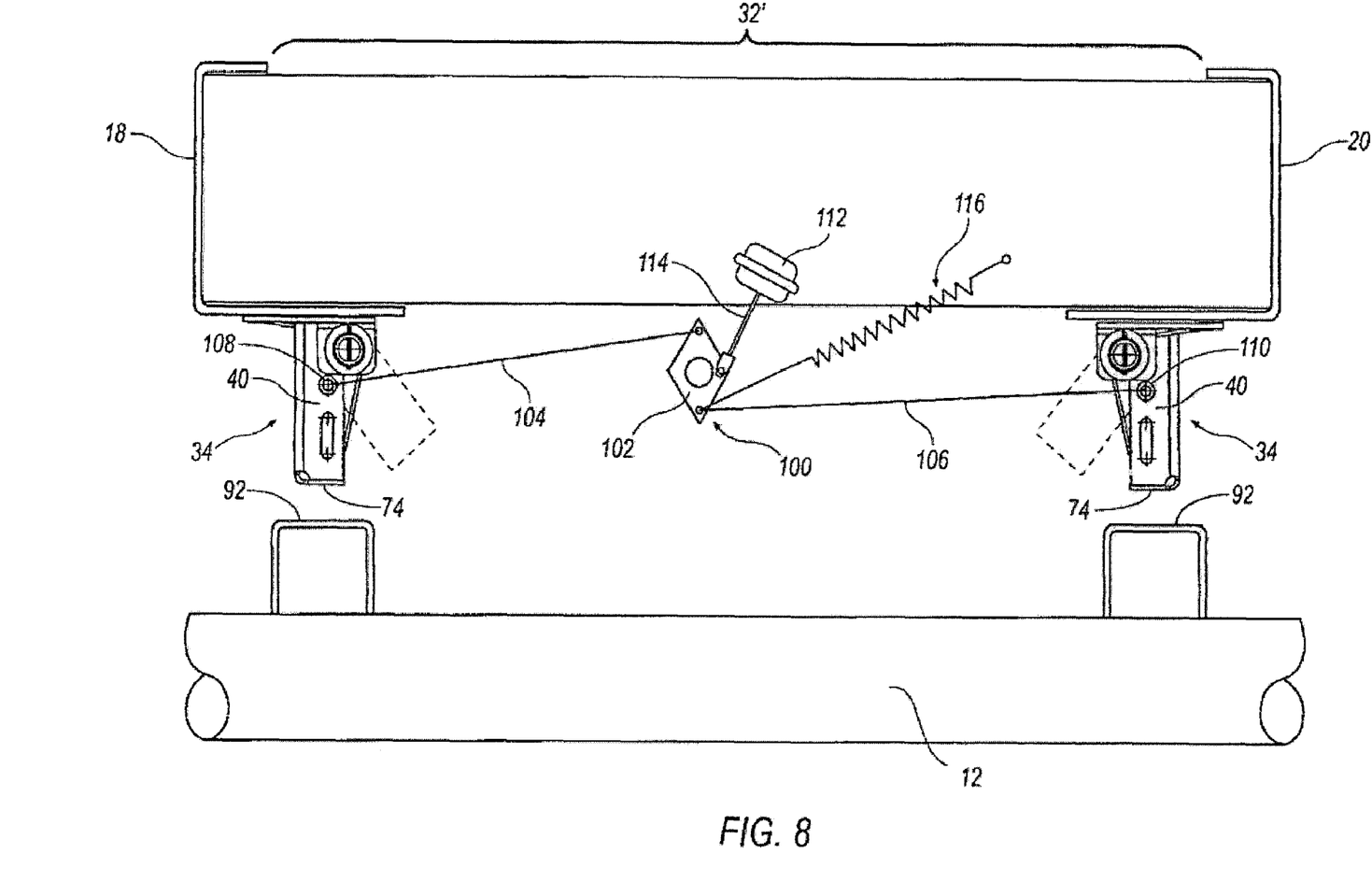
FIG. 8 is a schematic of an alternative embodiment of the dock lock assembly of the present invention.

An alternative embodiment of locking assembly 32' is illustrated in FIG. 8. In locking assembly 32', air bag 36 is replaced with a linkage assembly 100. Linkage assembly 100 is positioned between columns 40 and includes a pivot portion 102 having a pair of linkages 104 and 106 operatively connected thereto. End portions 108, 110 of linkages 104, 106 are connected to column sub-assemblies 34. An air diaphragm 112 is also connected to pivot portion 102 by a push rod assembly 114. A tension spring 116 is also connected to pivot portion 102 and acts against pivot portion 102 to place column sub-assemblies 34 in a locked position with columns 40 generally perpendicular to base portion 38. To unlock locking assembly 32', air diaphragm 112 actuates push rod assembly 114 such that pivot portion 102 moves upwardly against the force of tension spring 116, thereby lifting columns 40 upward and toward the interior of frame 10. Those familiar with the art will recognize that an air cylinder or air spring may be used in place of air diaphragm 112.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. An anti-creep locking mechanism for a suspension of a trailer, comprising:

a frame having at least two longitudinally-extending rail members and at least one cross member extending transversely between and being attached to said rail members;

at least one column member sub-assembly comprising a pivotable column member having a pivoting end and a contact portion, a spring and said column member being mounted on a rotatable shaft, said rotatable shaft connected to a base member, said base member mounted on at least one mounting structure selected from the group consisting of said at least one cross member and said rail members, the column member being selectively positionable between a first position, wherein said contact portion is pivoted downwardly and away from said mounting structure, and a second position wherein the contact portion is pivoted upwardly and toward the mounting structure, said contact portion being disposed laterally inboard when said column member is in said second position, said spring biasing the column member into said first position; and an actuator assembly for overcoming said spring biasing of said column member to pivot the column member into said second position, whereby when said column member is in said first position, said frame is maintained at a predetermined height to prevent creep of said trailer.

2. The anti-creep locking mechanism of claim 1, wherein said spring includes a coiled section, a first end that extends linearly outwardly from said coiled section, and a second end that extends linearly from the coiled portion and further includes a contacting section for contacting a portion of said column member to bias the column member into said first position.

3. The anti-creep locking mechanism of claim 1, wherein said contacting portion is substantially planar and has a width that is approximately equivalent to a width of said column member.

4. The anti-creep locking mechanism of claim 3, wherein said column member includes a pair of side walls, a rear wall, and said contacting portion, wherein said side walls are spaced-apart by said rear wall and define a width of the column member, wherein the contacting portion is connected to the side walls and the rear wall so as to enclose an end of said column member.

5. The anti-creep locking mechanism of claim 4, wherein said side walls of said column member are fixedly connected to said shaft.

6. The anti-creep locking mechanism of claim 1, wherein said base member includes a pair of upwardly extending flanges, said shaft being rotatably mounted on said flanges.

7. The anti-creep locking mechanism of claim 1, wherein said actuator assembly includes a selectively inflatable air bag having an end connected to said column member, said air bag being operatively connected to a pressure source such that the air bag is inflated by said pressure source and the inflation of said air bag retracts the column member into said second position.

8. The anti-creep locking mechanism of claim 1, wherein said actuator assembly includes a pivot and linkage mechanism connected to a pressure source, said pivot and linkage mechanism having a pivot biased into a first position by a pivot spring, a linkage having one end connected to said pivot and a second end connected to said column member, said pressure source being operatively connected to an actuating arm that is connected to the pivot, the pressure source activating said actuating arm to overcome the biasing force generated by said pivot spring to operate said pivot, thereby causing said linkage to lift the column member into said second position.

9. The anti-creep locking mechanism of claim 1 wherein said locking mechanism includes a pair of column members and said actuator is positioned between and connected to both of said column members.

10. An anti-creep locking mechanism for a suspension of a trailer, comprising:

a frame having at least two longitudinally-extending rail members and at least one cross member extending transversely between and being attached to said rail members;

a pair of column member sub-assemblies, each comprising a pivotable column member having a pivoting end and a contact portion, a spring and said column member being mounted on a rotatable shaft, said rotatable shaft connected to a base member, said base member mounted on at least one mounting structure selected from the group consisting of said at least one cross member and said rail members, the column member being selectively positionable between a first position, wherein said contact portion is pivoted downwardly and away from said mounting structure, and a second position, wherein the contact portion is pivoted upwardly and toward the mounting structure, said spring biasing said column member into said first position, each of said column member sub-assemblies opposing one another; and an air bag positioned between each of said column member sub-assemblies, said air bag having a first end connected to one of said column members and a second end connected to the other of the column members; wherein the air bag is operatively connected to a pressure source, said pressure source serving to inflate said air bag under predetermined conditions, wherein inflation of the air bag overcomes said biasing force of said spring to pivot said column members into said second position, whereby when the column members are in said first position, said frame is maintained at a predetermined height to prevent creep of said trailer.

11. The anti-creep locking mechanism of claim 10, wherein said air bag further includes angle sections positioned on each of said ends of said air bag, said angle sections serving as an angle limiter for said column members.

12. The anti-creep locking mechanism of claim 10, wherein said pressure source is a parking brake circuit.

13. The anti-creep locking mechanism of claim 10, further including a pair of contact pads each one of which are positioned on a respective one of a pair of connector arms that extend over a rear axle of the trailer, each one of said contact pads being aligned and positioned underneath a respective one of said contacting portions of said column members when said column members are in said first position.

14. The anti-creep locking mechanism of claim 10, wherein each of said column members are fixedly secured to a center portion of said shaft and said spring includes a coiled section that is wrapped around the shaft and positioned on one side of said shaft adjacent to the column member, the spring further including a first end that extends linearly outwardly from said coiled section and over a portion of said base member, and a second end that extends linearly from the coiled portion and further includes a contacting section that extends across said column member such that said contacting section acts against a surface of the column member to bias said column member in said first position.

15. The anti-creep locking mechanism of claim 10, wherein said base portion includes a pair of upstanding mounting flanges and said shaft extends through corresponding openings formed through said flanges and said spring further includes fasteners for securing the shaft to the mounting flanges.

16. The anti-creep locking mechanism of claim 10, wherein each of said column members are defined by at least a pair of side walls and said contacting portion, said side walls each having a first edge that is fixedly secured to said shaft.

17. An anti-creep locking mechanism for a suspension of a trailer, comprising:
   a frame having at least two longitudinally-extending rail members and at least one cross member extending between and being attached to said rail members;
   a pair of column member sub-assemblies, each comprising a pivotable column member having a pivoting end and a contact portion, a spring and said column member being mounted on a rotatable shaft, said rotatable shaft connected to a base member, said base member mounted on at least one mounting structure selected from the group consisting of said at least one cross member and said rail members, the column member being selectively positionable between a first position, wherein said contact portion is pivoted downwardly and away from said mounting structure, and a second position, wherein the contact portion is pivoted upwardly and toward the mounting structure, said spring biasing said column member into said first position, each of said column member sub-assemblies opposing one another; and
   a pivot and linkage assembly positioned between each of said column member sub-assemblies, said pivot and linkage assembly including a pivot member that is connected to a biasing pivot spring, a first linkage having a first end connected to one of said column members and a second end connected to said pivot member, a second linkage having a first end connected to the other one of the column members and a second end connected to the pivot member, and a pressure source having an actuating push rod connected to said pivot member, said pressure source serving to overcome the biasing force of said pivot spring and said spring of the column member sub-assemblies, the pressure source pivoting the pivot member to retract and pivot said column members into a second position, whereby when the column members are in said first position, said frame is maintained at a predetermined height to prevent creep of said trailer.

18. The anti-creep locking mechanism of claim 17, wherein said pressure source is an air diaphragm.

19. The anti-creep locking mechanism of claim 17, wherein each of said column members is fixedly secured to a center portion of said shaft, said spring including a coiled section being wrapped around the shaft and positioned on one side of said shaft adjacent to said column member, the spring further including a first end that extends linearly outwardly from said coiled section and over a portion of said base member, and a second end that extends linearly from the coiled portion and further including a contacting section that extends across the column member such that said contacting section acts against a surface of said column member to bias the column member into said first position.

20. The anti-creep locking mechanism of claim 17, said base member including a pair of upstanding mounting flanges, said shaft extending through corresponding openings formed through said flanges, said spring further including fasteners for securing the shaft to the flanges.

21. The anti-creep locking mechanism of claim 17, where said pressure source is an air spring.

22. The anti-creep locking mechanism of claim 17, where said pressure source is an air cylinder.

* * * * *

UNITED STATES PATENT AND TRADEMARK OFFICE
CERTIFICATE OF CORRECTION

PATENT NO. : 7,293,781 B2
APPLICATION NO. : 11/118639
DATED : November 13, 2007
INVENTOR(S) : Andrew Power and James F. Ziech It is certified that error appears in the above-identified patent and that said Letters Patent is hereby corrected as shown below:

Column 5, line 23, after the word "position" insert --,--.

Signed and Sealed this

Twenty Second Day of April, 2008

JON W. DUDAS
*Director of the United States Patent and Trademark Office*